United States Patent
Suda

(10) Patent No.: US 7,355,821 B2
(45) Date of Patent: Apr. 8, 2008

(54) MAGNETO RESISTIVE (MR) HEAD

(75) Inventor: Takashi Suda, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 631 days.

(21) Appl. No.: 11/052,814

(22) Filed: Feb. 9, 2005

(65) Prior Publication Data

US 2005/0207069 A1  Sep. 22, 2005

(30) Foreign Application Priority Data

Mar. 16, 2004  (JP) .............................. 2004-073662

(51) Int. Cl.
*G11B 5/33*  (2006.01)
(52) U.S. Cl. ..................................... 360/323
(58) Field of Classification Search ..................... None
See application file for complete search history.

(56) References Cited

U.S. PATENT DOCUMENTS 6,038,106 A * 3/2000 Aboaf et al. ................ 360/317
6,166,913 A * 12/2000 Fun et al. .................... 361/737
6,607,923 B2 * 8/2003 Carr et al. ...................... 438/3
6,704,174 B2 * 3/2004 Soda et al. .................. 360/323
6,985,336 B2 * 1/2006 Soda et al. .................. 360/323

FOREIGN PATENT DOCUMENTS

JP  2001-291215 A  10/2001
JP  2003-123215 A  4/2003

* cited by examiner

*Primary Examiner*—Allen Cao
(74) *Attorney, Agent, or Firm*—Sughrue Mion, PLLC

(57) ABSTRACT

Disclosed is an MR head in which the MR element resists damage due to ESD. A magneto resistive head to be in contact with a running magnetic tape includes a substrate, an insulating layer, a magneto resistive element located in the insulating layer, at least one shield layer for shielding the magneto resistive element from magnetic fields, and a conductive layer that has a conductive surface being in contact with the magnetic tape and that is electrically connected to the substrate. In this head, static electricity accumulated on the magnetic tap is discharged through the conductive layer and the substrate.

20 Claims, 2 Drawing Sheets

MAGNETO RESISTIVE (MR) HEAD

BACKGROUND OF THE INVENTION

1. Field of the Invention

An apparatus consistent with the present invention relates to a magneto resistive (MR) head having a magneto resistive (MR) element.

2. Description of the Related Art

Recently, the recording density of magnetic tapes has been increased. In order to follow this trend, magneto resistive (MR) heads have necessarily been used as heads for reading magnetic signals in tape drives (e.g. magnetic recording/reproducing apparatuses), instead of conventional inductive heads. An MR head has a magneto resistive (MR) element which possesses a high sensing sensitivity to magnetic signals and enables a high reproducing output. Therefore, use of an MR head makes it possible to narrow the recording tracks on a magnetic tape and to increase the line recording density of a magnetic tape, thereby realizing the high density recording and reproduction.

MR heads, however, have a property of being sensitive to static electricity and heat, in comparison with conventional inductive heads. Concretely, if an electrostatically charged magnetic tape approaches an MR head or comes into contact with it, then the static electricity is discharged through the MR head. As a result, the MR head may be damaged due to the electro-static discharge (ESD).

To overcome this disadvantage, the following conventional technique has been employed (see Japanese Unexamined Patent Application Publication 2003-123215). In this technique, an MR head has a structure that an MR element is sandwiched between magnetic shield layers and between insulating layers. Further, a substrate and a protective substrate, which are formed on the respective sides of the MR element, are both grounded. If an electrostatically charged magnetic tape comes into contact with this MR head, then the static electricity is discharged through the substrate and the protective substrate, instead of the MR element. As a result, the MR head is prevented from being damaged.

Even in this MR head, however, static electricity on a magnetic tape is not always discharged sufficiently through the substrate and the protective substrate, and the static electricity may be discharged through the MR element or charge an insulating layer formed near the MR element. In this case, the MR element is possibly damaged.

Taking the above disadvantage into account, the present invention has been conceived. An object of the present invention is to provide an MR head in which the MR element resists damage due to ESD.

SUMMARY OF THE INVENTION

According to an aspect of the present invention, there is provided, a magneto resistive head to be in contact with a running magnetic tape, including:

(1) a substrate;
(2) an insulating layer;
(3) a magneto resistive element located in the insulating layer;
(4) at least one shield layer for shielding the magneto resistive element from magnetic fields; and
(5) a conductive layer having a conductive surface being in contact with the magnetic tape, the conductive layer being electrically connected to the substrate.

In this magneto resistive head, static electricity accumulated on the magnetic tape is discharged through the conductive layer. Accordingly, even if the electrostatically charged magnetic tape approaches the head or comes into contact with it, the static electricity does not flow into the magneto resistive element. In this case, the magneto resistive element is not heated and damaged due to ESD. Consequently, it is possible to protect the magneto resistive element from static electricity.

Furthermore, the magneto resistive head includes the protective layer for protecting the conductive layer.

With this the protective layer, the magneto resistive head is prevented from being scratched and wearing due to magnetic powder of the magnetic tape.

According to another aspect of the present invention, there is provided, a magneto resistive head to be in contact with a running magnetic tape, including:

(a) a substrate;
(b) an insulating layer;
(c) a magneto resistive element located in the insulating layer;
(d) at least one shield layer for shielding the magneto resistive element from magnetic fields; and
(e) at least one conductive region formed in the insulating layer and between the shield layer and the substrate, the conductive region having a surface which is exposed from the insulating layer and which is in contact with the magnetic tape, the conductive region being electrically connected to the substrate, In this magneto resistive head, static electricity accumulated on the magnetic tape is discharged through the conductive region and the substrate. Accordingly, even if the electrostatically charged magnetic tape approaches the head or comes into contact with it, the static electricity does not flow into the magneto resistive element. In this case, the magneto resistive element is not heated and damaged due to ESD. Consequently, it is possible to protect the magneto resistive element from static electricity.

Furthermore, the magneto resistive head includes a conductive boundary layer formed between the conductive region in the insulating layer and the substrate.

With the conductive boundary layer, static electricity is discharged through the conductive region, the boundary layer and the substrate. Hence, discharging of static electricity is further facilitated.

In conclusion, with a magneto resistive head of the present invention, its magneto resistive element is not damaged even when electrostatically charged magnetic tapes approach or come into contact with the head.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

Figure 1:
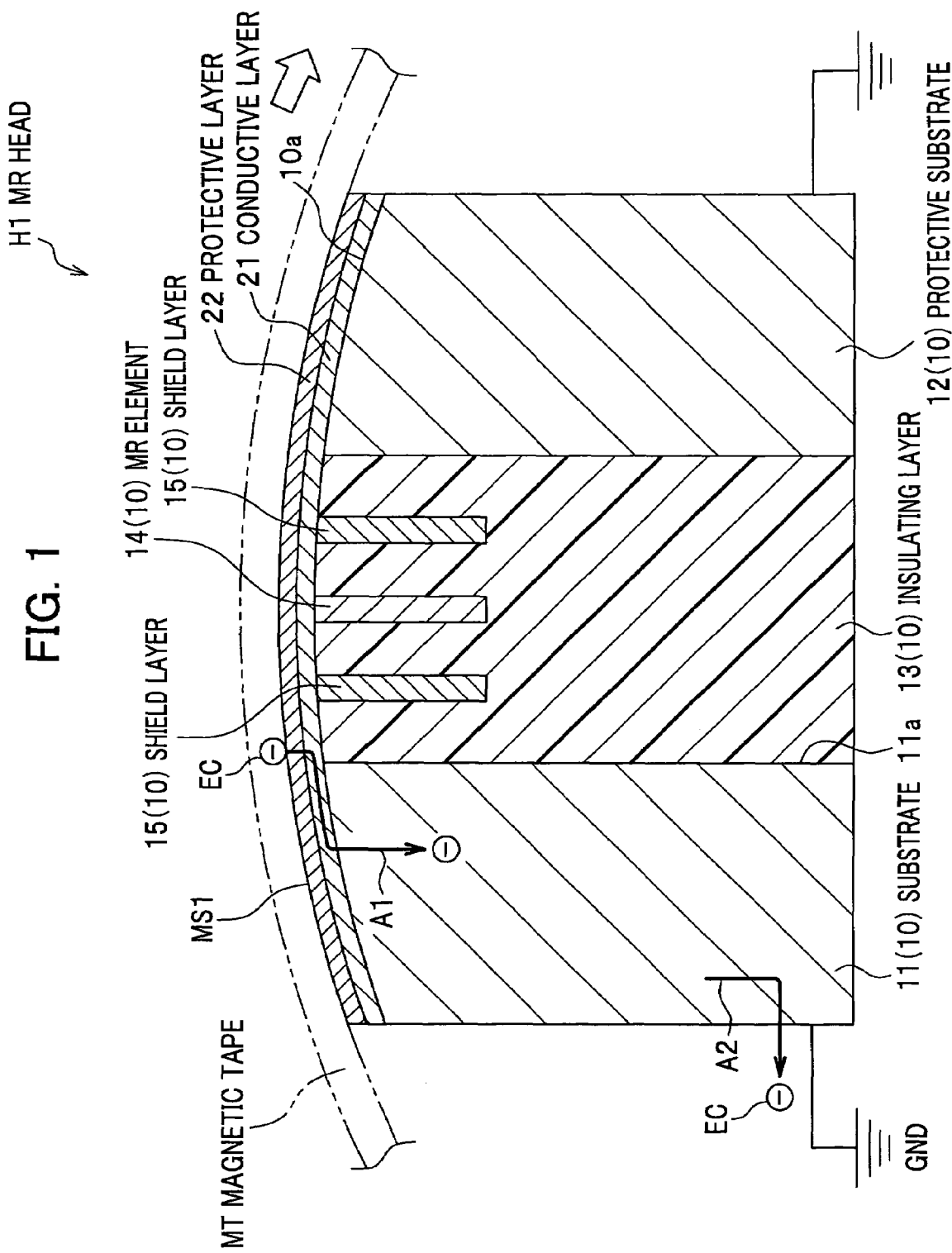
FIG. 1 is a cross-sectional view schematically depicting an MR head according to a first embodiment of the present invention.

A description will be given below in detail of a magneto resistive (MR) head according to embodiments of the present invention. In the following embodiments, the same reference numerals are given to similar components, and duplicate description is therefore omitted.

First Embodiment

A description will be given below of a magneto resistive (MR) head according to a first embodiment of the present invention, with reference to FIG. 1.

<Structure of MR Head>

Referring to FIG. 1, an MR head H1 includes, as main components, an MR head main body 10, a conductive layer 21 and a protective layer 22. Furthermore, the MR head main body 10 includes an MR element 14, shield layers 15 and 15, and an upper surface 10a which is located near a running magnetic tape MT, and where the MR element 14 and the shield layers 15 and 15 are partially exposed. The conductive layer 21 and the protective layer 22 are stacked on the upper surface 10a sequentially. The upper surface of the protective layer 22 serves as a magnetic tape contact surface MS1 to be in contact with the magnetic tape. zIn this embodiment, a description will be given, assuming that an MR head of the present invention is applied to the reproducing MR head H1. This MR head H1 uses an MR element 14 to read magnetic signals from the magnetic tape MT running in the direction from right to left of FIG. 1.

[MR Head Main Body]

The MR head main body 10 includes, as main components, a substrate 11 having an edge surface 11a, an insulating layer 13, a protective substrate 12, the MR element 14, and shield layers 15 and 15. The insulating layer 13 and the protective substrate 12 are stacked on the edge surface 11a sequentially. The MR element 14 and the shield layers 15 and 15 are partially exposed from the upper surface 10a of the MR head main body 10, and are embedded in the insulating layer 13. In other words, the MR head main body 10 has a structure that the insulating layer 13, in which the MR element 14 and the shield layers 15 and 15 are formed, is sandwiched between the substrate 11 and the protective substrate 12.

(Substrate and Protective Substrate)

The substrate 11 and the protective substrate 12 serve as supporting bodies in the MR head H1, and are each made of an alumina titanium carbide ($Al_2O_3$—TiC) alloy that is generally called as AlTiC. They contain carbon (C) that is a conductive element and, thus exhibit conductivity. The substrate 11 and the protective substrate 12 are secured to a metal chassis (not shown) of a tape drive (not shown) through a conducting paste formed of, for example, silver, and they are at a ground potential. In this case, the MR head H1 is assumed to be a fixed head.

(Insulating Layer)

The insulating layer 13 electrically isolates the MR element 14, and is made of insulating material such as alumina ($Al_2O_3$) or silica ($SiO_2$)

(MR Element)

The MR element 14 is connected to a detector (not shown) through a wire, and varies its resistance in accordance with the intensity of the magnetic signals. The detector senses the variation in the resistance of the MR element 14 through the wire. As a result, the magnetic signals are read from the magnetic tape MT.

(Shield Layer)

The shield layers 15 and 15 are each made of magnetic material such as a Fe—Si—Al alloy (sendust), a Ni—Fe alloy (permalloy) or a Ni—Zn alloy (hematite).

Next, a description will be given below of an arrangement of the MR element 14 and the shield layers 15 and 15. The MR element 14 is positioned in the gap between the shield layers 15 and 15. Moreover, the MR element 14 is embedded in the insulating layer 13 at the approximately center and along the thickness (i.e. in the direction perpendicular to the running direction of the magnetic tape MT as shown in FIG. 1). Also, the MR element 14 is partially exposed from the upper surface of the insulating layer 13. The shield layers 15 and 15 are also embedded in the insulating layer 13, partially exposed from the upper surface of the insulating layer 13. The shield layers 15 and 15 are located away from the respective sides of the MR element 14 by a predetermined distance. Also, they are located away from the respective interfaces between the substrate 11 and the insulating layer 13 and between the insulating layer 13 and the protective substrate 12 by another predetermined distance.

The reason why these shield layers 15 and 15 are arranged near the respective sides of the MR element 14 is to electromagnetically shield the MR element 14 from magnetic fields, that is, noise sources. Consequently, the frequency response and resolution of the MR element 14 are enhanced. The parts of the insulating layer 13, each of which is located between the MR element 14 and the shield layer 15, are called gap layer or insulating film.

(Conductive Layer)

The conductive layer 21 is formed covering the upper surface 10a of the MR head main body 10, and serves as a foundation layer for the protective layer 22. Specifically, the conductive layer 21 covers the respective upper surfaces of the substrate 11, the protective substrate 12 and the insulating layer 13 where the MR element 14 and the shield layers 15 and 15 are arranged.

The conductive layer 21 is made of non-magnetic material such as silicon (Si), carbon (C) or a mixture of silicon carbide (SiC) and carbon (C), for example. This conductive layer 21 contains carbon (C) that is a conductive element and, therefore exhibits favorable conductivity. Accordingly, the conductive layer 21 is electrically connected to the substrate 11 and the protective substrate 12.

In this structure, static electricity accumulated on the magnetic tape MT tends to be discharged through the conductive layer 21, the substrate 11 and the protective substrate 12 appropriately. In other words, electric charge EC on the magnetic tape MT flows to the chassis through the conductive layer 21, the substrate 11 and the protective substrate 12. In this way, it is possible to prevent the MR element 14 from being damaged due to ESD.

In the conductive layer 21, it is preferable that the carbon (C) content is equal to/more than 50% in terms of the conductivity, and the resistivity is 1 $\Omega$cm to $10^6$ $\Omega$cm. In addition, it is preferable that the conductive layer 21 is 1 nm to 20 nm in thickness. Because, if the conductive layer 21 is formed to thinner than 1 nm, then its thickness may be irregular. Otherwise, if being thicker than 20 nm, then it causes spacing loss or deteriorates the reproducing property of the MR head H1.

[Protective Layer]

The protective layer 22 is formed on the upper side of the conductive layer 21. In addition, the protective layer 22 reduces: (1) the level of wear of the MR head H1 by sliding of the magnetic tape MT; (2) the level of contaminants on the conductive layer 21 due to magnetic powder of the magnetic tape MT; and (3) the level of oxidation of the MR element 14. The upper surface of the protective layer 22 serves as a magnetic tape contact surface MS1.

The protective layer 22 is made of, for example, diamond like carbon (DLC) or amorphous carbon. The protective layer 22 contains carbon (C) and, therefore has a close affinity for the conductive layer 21 containing carbon (C). Hence, the affinity between the protective layer 22 and the conductive layer 21 is improved so that the protective layer 22 resists peeling off the conductive layer 21. Furthermore, since diamond like carbon (DLC) or amorphous carbon is hard, the wear of the protective layer 22, that is, of the MR head H1 due to the contact of the magnetic tape MT is minimized. It is preferable that the protective layer 22 is 2 nm to 50 nm in thickness. This thickness is preferably large in terms of the protection of the MR element 14. However, if the protective layer 22 is thicker than 50 nm, then the property in which the MR head H1 senses the magnetic signals from the magnetic tape MT is deteriorated.

<Operation of MR Head>

An operation of the MR head H1 will be described below briefly with reference to FIG. 1.

Referring to FIG. 1, once the magnetic tape MT on which static electricity is accumulated, that is, the magnetic tape MT carrying electric charge EC comes into contact with the MR head H1, the electric charge EC flows into the conductive-layer 21 of high conductivity through the protective layer 22, and then, into the substrate 11 (see an arrow A1 of FIG. 1). Finally, the electric charge EC in the substrate 11 flows to the chassis of the tape drive through the conductive paste (see an arrow A2 of FIG. 1).

In this way, static electricity accumulated on the magnetic tape MT is discharged. In this case, upon discharge of the static electricity, a large current does not flow into the MR element, as well as the electric charge EC does not accumulate in the insulating layer 13 near the MR element 14. Consequently, the MR element 14 is not heated and damaged due to ESD. In other words, it is possible to prevent the MR head H1 from being damaged due to ESD.

<Method for Manufacturing MR Head>

A method for manufacturing the MR head will be described blow briefly with reference to FIG. 1.

First, on one surface of the substrate 11 made of AlTiC, the insulating layer 13, the MR element 14, and the shield layers 15 and 15 are formed by means of a sputtering technique on the condition that predetermined elements or compounds are used as targets. In addition, the insulating layer 13 is formed in several steps, and in certain steps, the shield layer 15, the MR element 14 and the shield layer 15 are formed, respectively. Subsequently, the protective substrate 12 of a predetermined form is boned to the insulating layer 13, and is then subjected to a predetermined polishing treatment, thus completing the manufacture of the MR head main body 10.

Next, on the upper surface 10a of the MR head main body 10, targets such as both silicon (Si) and carbon (C) or both silicon carbide (SiC) and carbon (C) are deposited by means of a sputtering technique, and are then subjected to a predetermined polishing treatment, thereby forming the conductive layer 21.

Moreover, on the upper surface of the conductive layer 21, carbon (C) as a target is deposited by means of a sputtering technique, and is then subjected to a predetermined polishing treatment, thereby forming the protective layer 22, that is, completing the manufacture of the MR head H1.

Note that, in the protective layer 22, diamond like carbon (DLC) or amorphous carbon can selectively be formed by regulating various conditions, such as the flow amount and flowing time of sputtering gas, the distance of the target, the output level of a high frequency wave, the degree of vacuum, and the rotation speed and orbital speed of a stage.

Second Embodiment

A description will be given below of an MR head according to a second embodiment of the present invention, with reference to FIG. 2.

<Structure of MR Head>

Figure 2:
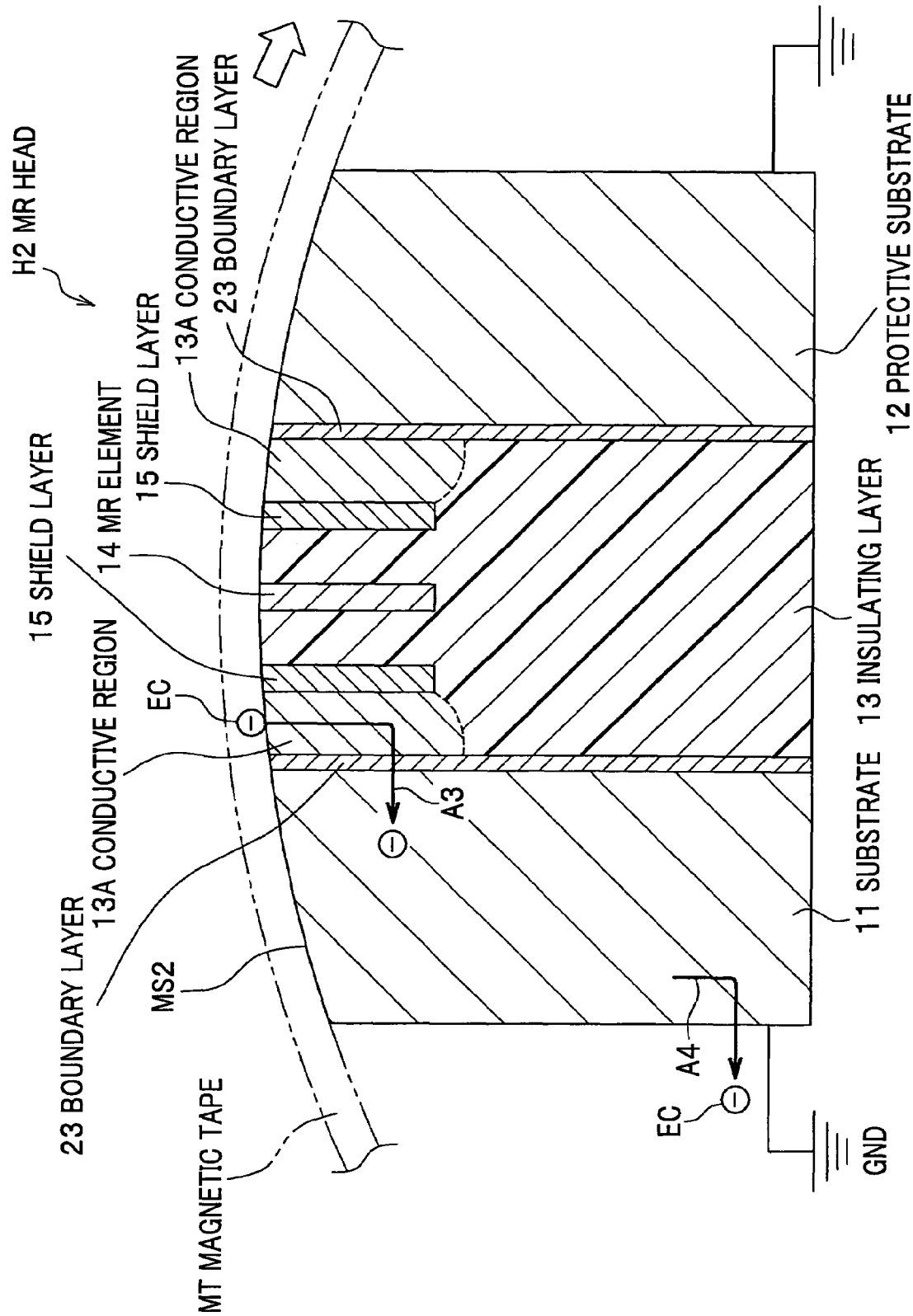
FIG. 2 is a cross-sectional view schematically depicting an MR head according to a second embodiment of the present invention.

Referring to FIG. 2, the MR head H2 according to the second embodiment is not provided with the conductive layer 21 and the protective layer 22 according to the first embodiment (see FIG. 1). Instead, the insulating layer 13 incorporates insulating conductive regions 13A each containing a high concentration of carbon (C). In addition, boundary layers 23 and 23 are formed on the respective sides of the insulating layer 13. The MR head H2 has a magnetic tape contact surface MS2 to be in contact with the magnetic tape MT.

[Conductive Region]

Each conductive region 13A is a region of high conductivity, and is formed by partially mixing carbon (C) into alumina ($Al_2O_3$), etc. making up the insulating layer 13. The conductive regions 13A are partially exposed from the upper surface of the magnetic tape contact surface MS2, and are electrically connected to the corresponding boundary layers 23. The boundary layers 23 are conductive as will be described later and, therefore electrically connect the conductive regions 13A to the substrate 11 and the protective substrate 12, respectively.

[Boundary Layer]

The boundary layers 23 and 23 are arranged between the substrate 11 and the insulating layer 13 and between the insulating layer 13 and the protective substrate 12, respectively. Each boundary layer 23 contains non-magnetic material such as a mixture of silicon (Si) and carbon (C) or a mixture of silicon carbide (SiC) and carbon (C), similar to the conductive layer 21 according to the first embodiment. Since carbon (C), which is a conductive element, is contained, the boundary layer 23 exhibits excellent conductivity. Further, it is preferable that the carbon content is equal to/more than 50% in terms of the conductivity, and the resistivity of the boundary layer 23 is 1 $\Omega$cm to $10^6$ $\Omega$cm.

Since a large amount of carbon (C) is contained, each boundary layer 23 has a close affinity for the conductive region 13A containing carbon (C). Accordingly, the boundary layer 23 is in excellent contact with the conductive region 13A, and resists peeling it off.

It is preferable that the boundary layer 23 is 1 nm to 20 nm in thickness. If the boundary layer 23 is formed to thinner than 1 nm, then its surface tends to be irregular. Otherwise, if being thicker than 20 nm, then it causes spacing loss or deteriorates the reproducing property of the MR head H2.

The conductive regions 13A are electrically connected to the substrate 11 and the protective substrate 12 through the boundary layers 23, respectively. Hence, static electricity accumulated on the magnetic tape MT tends to be discharged through the substrate 11 and the protective substrate 12 through the respective conductive regions 13A and the respective boundary layers 23. Thus, the static electricity is not discharged through the MR element 14, making it possible to prevent the MR element 14 from being damage due to ESD.

<Operation of the MR Head>

An operation of the MR head H2 will be described below briefly with reference to FIG. 2.

Referring to FIG. 2, if the magnetic tape MT on which static electricity is accumulated, that is, the magnetic tape MT carrying electric charge EC comes into contact with the MR head H2, then the electric charge EC flows into the conductive regions 13A and the boundary layers 23. Following this, it flows into the substrate 11 and the protective substrate 12 (see an arrow A3 of FIG. 2). Finally, the electric charge EC in the substrate 11 flows to the chassis of the tape drive (see an arrow A4 of FIG. 2) so that the static electricity on the magnetic tape MT is discharged.

In this way, upon discharge of the static electricity, a large current does not flow into the MR element 14, as well as static electricity is not charged in the insulating layer 13 near the MR element 14. Consequently, the MR element 14 is not heated and damaged due to ESD.

<Method for Manufacturing MR Head>

A method for manufacturing the MR head H2 will be described below briefly with reference to FIG. 2.

First, the conductive regions 13A are formed by using carbon (C) as a target, in addition to the target used upon forming of the insulating layer 13 according to the first embodiment. For example, when the insulating layer 13 is formed by using alumina ($Al_2O_3$) as a target, the conductive regions 13A are formed by using a mixture of alumina ($Al_2O_3$) and carbon (C) in a 9:1 to 8:2 ratio as a target.

The boundary layers 23 are formed by means of a sputtering technique on the condition that a mixture of silicon (Si) and carbon (C) or a mixture of silicon carbide (SiC) and carbon (C) is used as a target, before the insulating layer 13 is formed on the substrate 11 and after the insulating layer 13 incorporating the conductive regions 13A is formed.

Up to this point, the preferred embodiments of the present invention have been described. However, it is obvious that an MR head of the present invention is not limited to those of the embodiments, and various modifications or variations may be conceived as appropriate without departing the sprit and scope of the present invention.

To give an example, the conductive layer 21 and the protective layer 22 according to the first embodiment may be formed on the magnetic tape contact surface MS2 according to the second embodiment.

In addition, in the first embodiment, the protective layer 22 may not necessarily be provided, if the conductive layer 21 has a high content of silicon carbide (SiC), is sufficiently hard and has an even surface.

In the first embodiment, the conductive layer 21 covers the whole area of the upper surface 10a. However, the conductive layer 21 may not necessarily do it, as long as covering the respective exposed parts of the MR element 14 and the shield layers 15 and 15, and being electrically connected to the substrate 11 and the protective substrate 12 which are both at ground potential.

In the first embodiment, the MR head H1 is applied to a reproducing MR head, but it may be applied to a recording/reproducing MR head. In addition, it may be a high-sensitivity GMR head having a cobaltic MR element.

In the first embodiment, an MR head is applied to a fixed head secured to the chassis of the tape drive, but it may be applied to a helical-scan type swivel head.

What is claimed is:

1. A magneto resistive head to be in contact with a running magnetic tape, comprising:
   a substrate;
   an insulating layer;
   a magneto resistive element located in the insulating layer;
   at least one shield layer for shielding the magneto resistive element from magnetic fields; and
   a conductive layer having a conductive surface being in contact with the magnetic tape, the conductive layer being electrically connected to the substrate;
   wherein static electricity accumulated on the magnetic tap is discharged through the conductive layer and the substrate.

2. The magneto resistive head according to claim 1, further comprising a protective layer for protecting the conductive layer.

3. The magneto resistive head according to claim 1, wherein the conductive layer covers at least one surface of the magneto resistive element, which faces the magnetic tape.

4. The magneto resistive head according to claim 1, wherein the conductive layer covers whole surfaces of the substrate and the insulating layer, which face the magnetic tape.

5. The magneto resistive head according to claim 1, wherein the conductive layer has a carbon content of at least 50%.

6. The magneto resistive head according to claim 1, wherein the conductive layer has resistivity ranging from 1 $\Omega$cm to $10^6$ $\Omega$cm.

7. The magneto resistive head according to claim 1, wherein the conductive layer has a thickness ranging from 1 nm to 20 nm.

8. The magneto resistive head according to claim 2, wherein the protective layer has a thickness ranging from 2 nm to 50 nm.

9. The magneto resistive head according to claim 1, wherein the shield layer is made of at least one of a Fe—Si—Al alloy, a Ni—Fe alloy and a Ni—Zn alloy.

10. A magneto resistive head to be in contact with a running magnetic tape, comprising:
    a substrate;
    an insulating layer;
    a magneto resistive element located in the insulating layer;
    at least one shield layer for shielding the magneto resistive element from magnetic fields; and
    at least one conductive region formed in the insulating layer and between the shield layer and the substrate, the conductive region having a surface which is exposed from the insulating layer and which is in contact with the magnetic tape, the conductive region being electrically connected to the substrate,
    wherein static electricity accumulated on the magnetic tape is discharged through the conductive region and the substrate.

11. The magneto resistive head according to claim 10, further comprising a conductive boundary layer formed between the conductive region in the insulating layer and the substrate.

12. The magneto resistive head according to claim 10, further comprising a conductive layer being in contact with the magnetic tape, the conductive layer being electrically connected to the substrate.

13. The magneto resistive head according to claim 10, further comprising a protective layer for protection from the magnetic tape.

14. The magneto resistive head according to claim 12, further comprising a protective layer for protecting the conductive layer.

15. The magneto resistive head according to claim 11, wherein the boundary layer has a carbon content of at least 50%.

16. The magneto resistive head according to claim 11, wherein the boundary layer has resistivity ranging from 1 $\Omega$cm to $10^6$ $\Omega$cm.

17. The magneto resistive head according to claim 11, wherein the boundary layer has a thickness ranging from 1 nm to 20 nm.

18. The magneto resistive head according to claim 12, wherein the conductive layer has resistivity ranging from 1 $\Omega$cm to $10^6$ $\Omega$cm.

19. The magneto resistive head according to claim 13, wherein the protective layer has a thickness ranging from 2 nm to 50 nm.

20. The magneto resistive head according to claim 14, wherein the protective layer has a thickness ranging from 2 nm to 50 nm.

* * * * *